United States Patent [19]

Bures

[11] Patent Number: 5,220,409
[45] Date of Patent: Jun. 15, 1993

[54] LIGHT BEAM DETECTION UTILIZING HOLOGRAM

[75] Inventor: Milan Bures, Tobaccoville, N.C.
[73] Assignee: AMP Incroporated, Harrisburg, Pa.
[21] Appl. No.: 814,301
[22] Filed: Dec. 18, 1991

Related U.S. Application Data

[63] Continuation of Ser. No. 286,558, Dec. 19, 1988, abandoned.

[51] Int. Cl.$^5$ ............................................. G01B 11/14
[52] U.S. Cl. ..................................... 356/375; 250/221
[58] Field of Search ..................... 356/375; 250/221; 340/709

[56] References Cited

U.S. PATENT DOCUMENTS

| | | | |
|---|---|---|---|
| 3,478,220 | 11/1969 | Milroy | 250/221 |
| 4,267,443 | 5/1981 | Carroll et al. | 250/221 |
| 4,305,071 | 12/1981 | Bell et al. | 340/712 |
| 4,310,756 | 1/1982 | Sick et al. | 250/221 |
| 4,346,376 | 8/1982 | Mallos | 340/712 |
| 4,420,261 | 12/1983 | Barlow et al. | 356/375 |
| 4,459,476 | 7/1984 | Weissmueller et al. | 250/221 |
| 4,467,193 | 8/1984 | Carroll | 250/216 |
| 4,673,918 | 6/1987 | Adler et al. | 340/365 P |
| 4,703,316 | 10/1987 | Sherbeck | 340/706 |
| 4,735,477 | 4/1988 | Bowen | 350/96.15 |

FOREIGN PATENT DOCUMENTS

2129666 12/1972 Fed. Rep. of Germany .
2131544 12/1983 United Kingdom .
2166831 5/1986 United Kingdom ................ 250/221

OTHER PUBLICATIONS

Buhler et al., "Laser Touch Entry Device", IEEE Nerem Record, Boston, Nov. 6-8, 1973, vol. 15, pp. 148-155.
Mintz et al. "Holographic Simulation of Parabolic Mirrors" *Applied Optics*, vol. 14, No. 3 (Mar. 1975) pp. 564-565.
Magariños, et al. "Holographic Mirrors" *Optical Engineering*, vol. 24, No. 5 (Sep./Oct. 1985) pp. 769-780.
Funk, B. K. "CCDs in optical touch panels deliver high resolution" *Electronic Design* Sep. 27, 1980 pp. 139-143.
Rao et al. "Holographic methods for the fabrication of various types of mirrors" *Rev. Sci. Instrum.* 51(6), Jun. 1980 pp. 809-813.

*Primary Examiner*—Richard A. Rosenberger
*Attorney, Agent, or Firm*—Robert W. Pitts; Anton P. Ness

[57] ABSTRACT

Light beam detection is taught in method and apparatus where a light source of coherent light is directed toward a reflecting hologram made to simulate a parabolic mirror to generate light beams detected by photoreceptors along one side of an opto-frame, such receptors being scanned in a manner to preclude false detection of an object within the field of light. An an alternative, multiple light sources are used with a single receptor and an appropriate hologram.

10 Claims, 8 Drawing Sheets

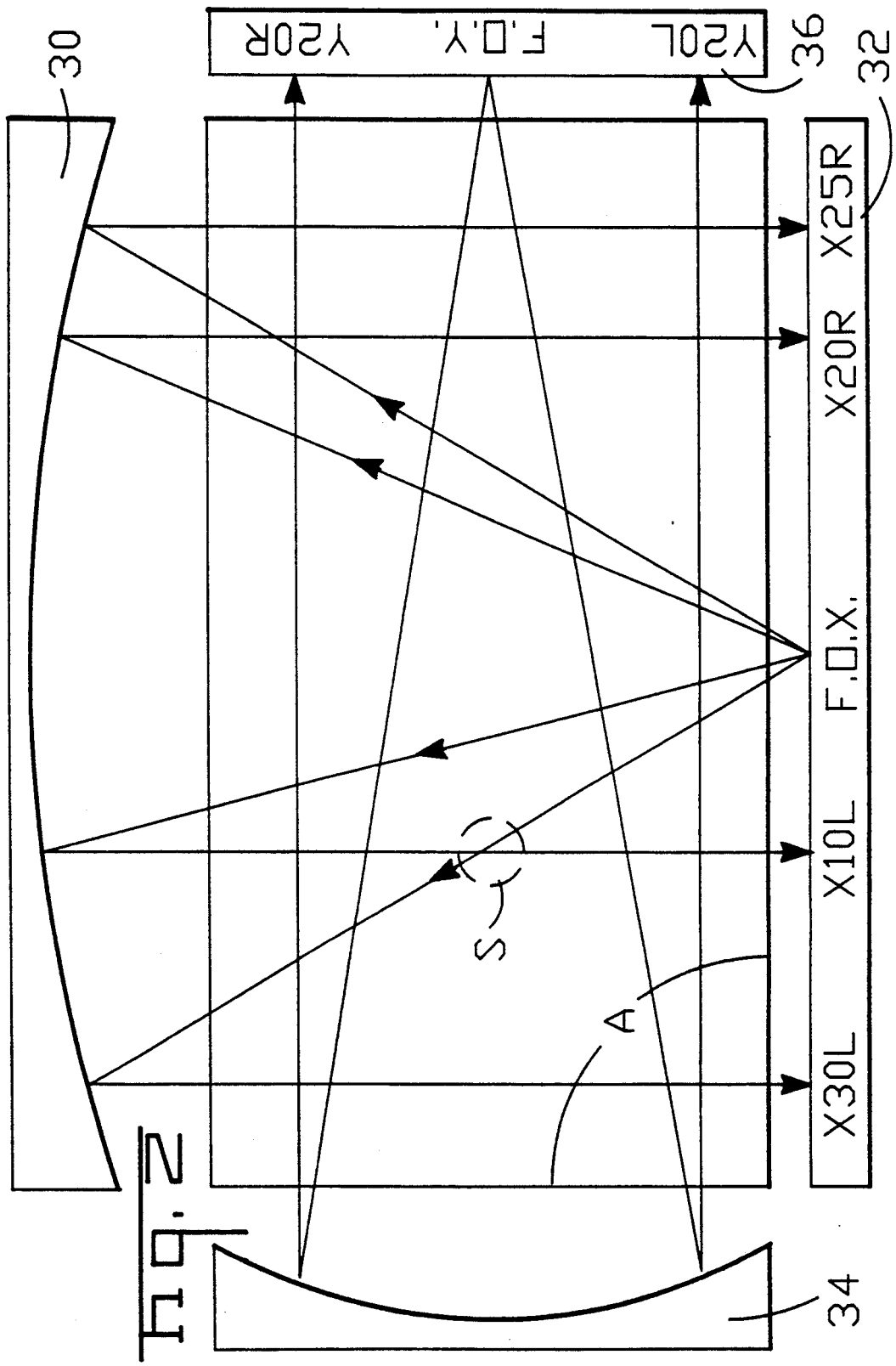

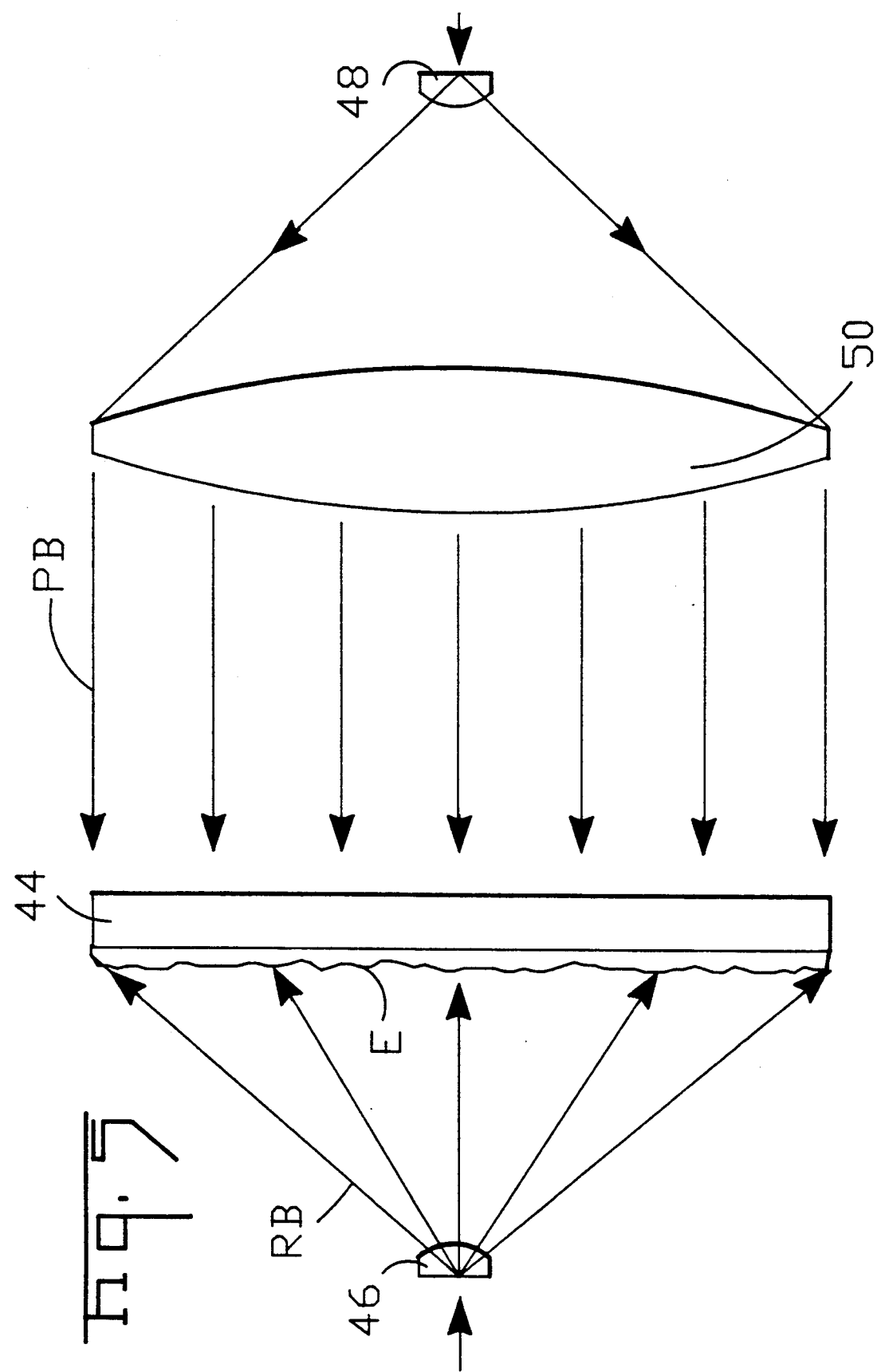

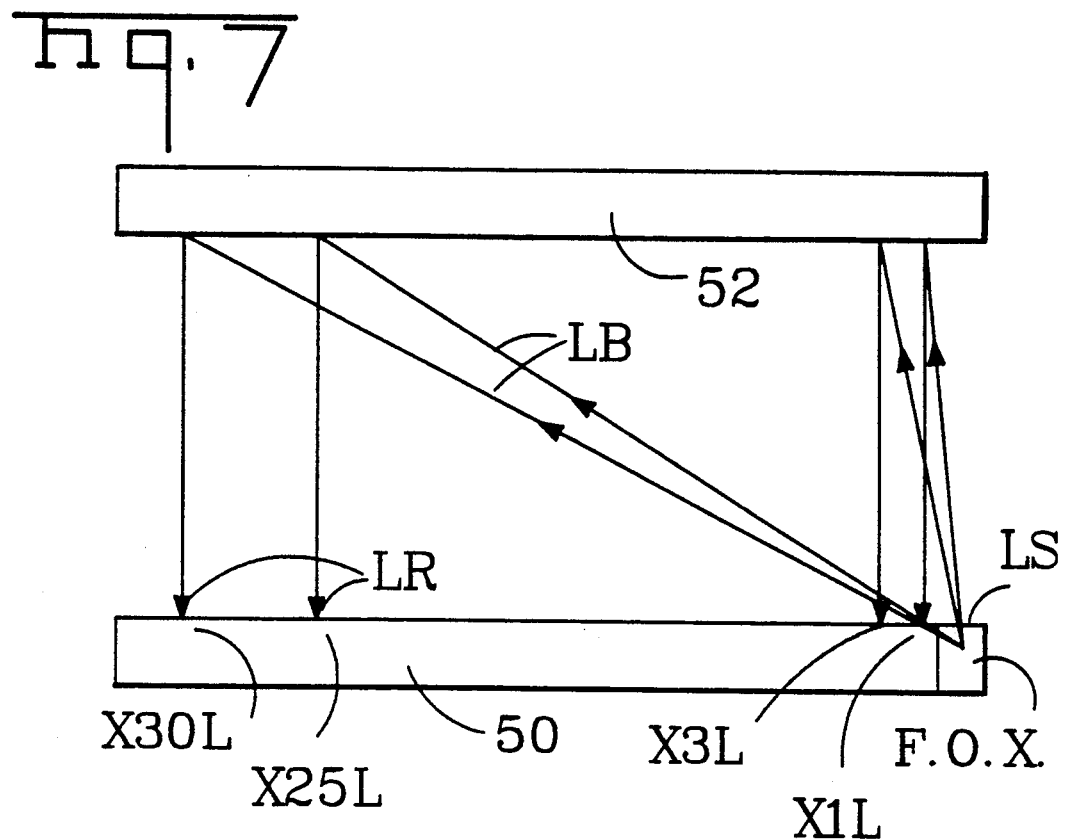
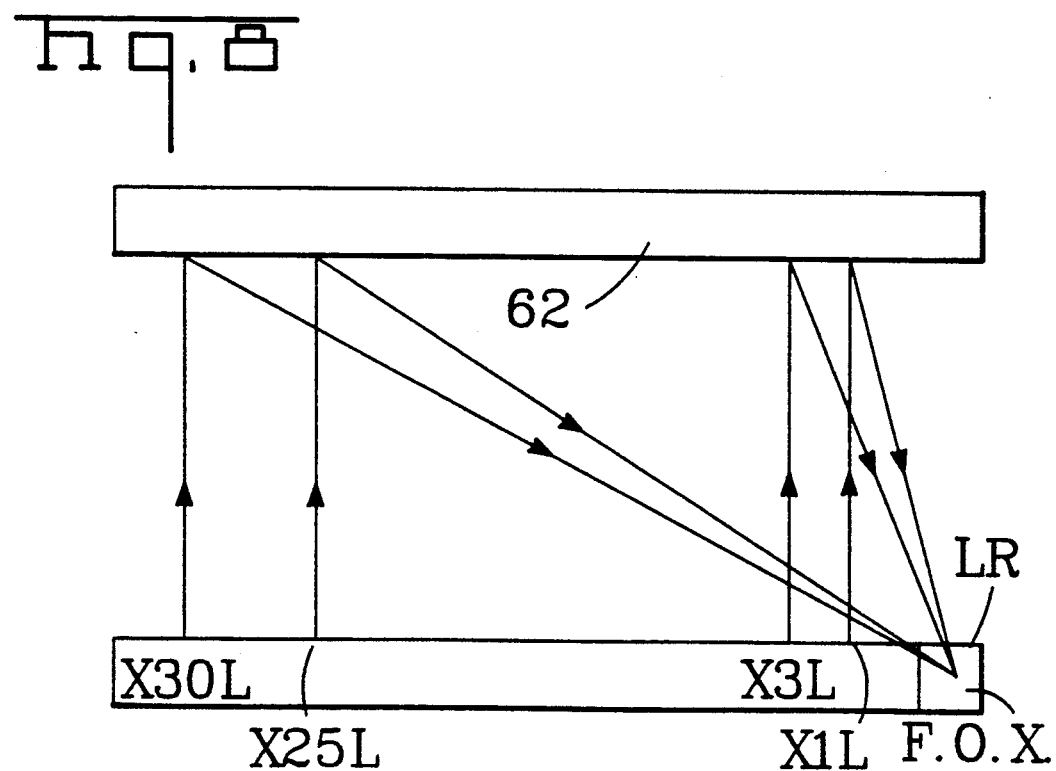

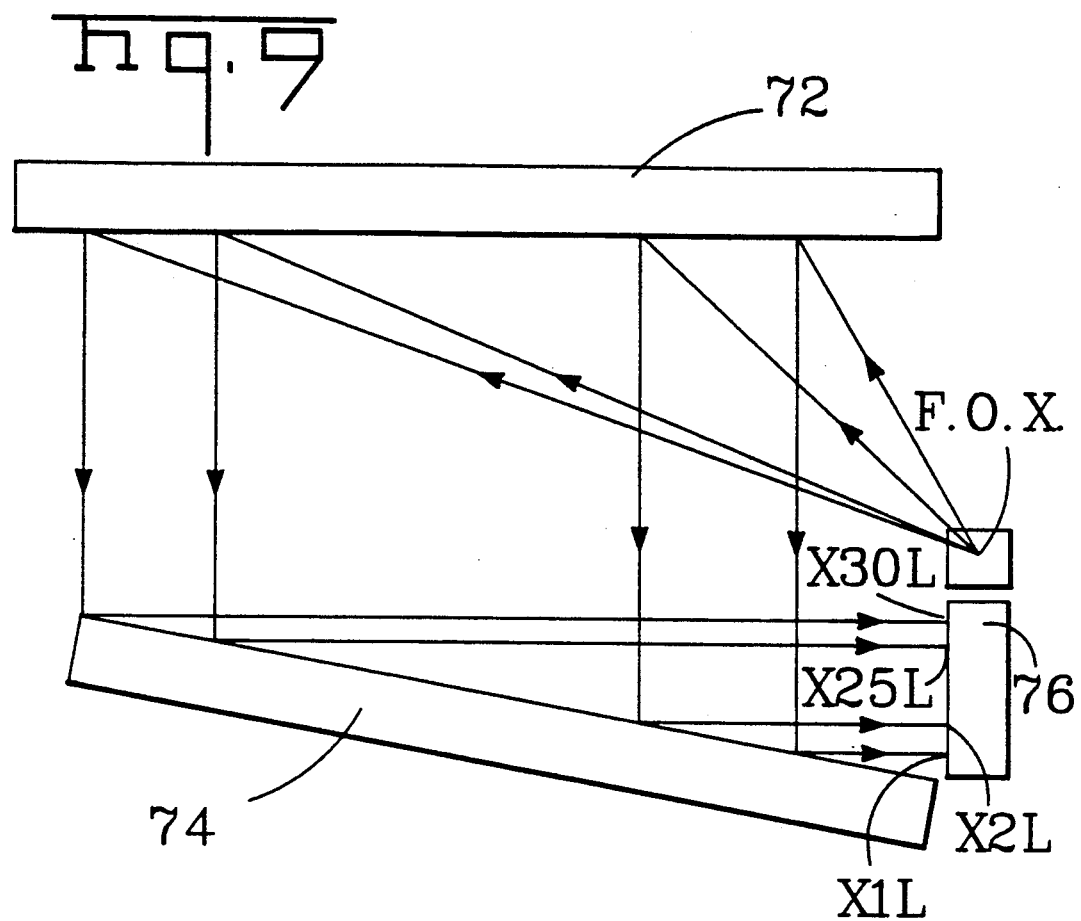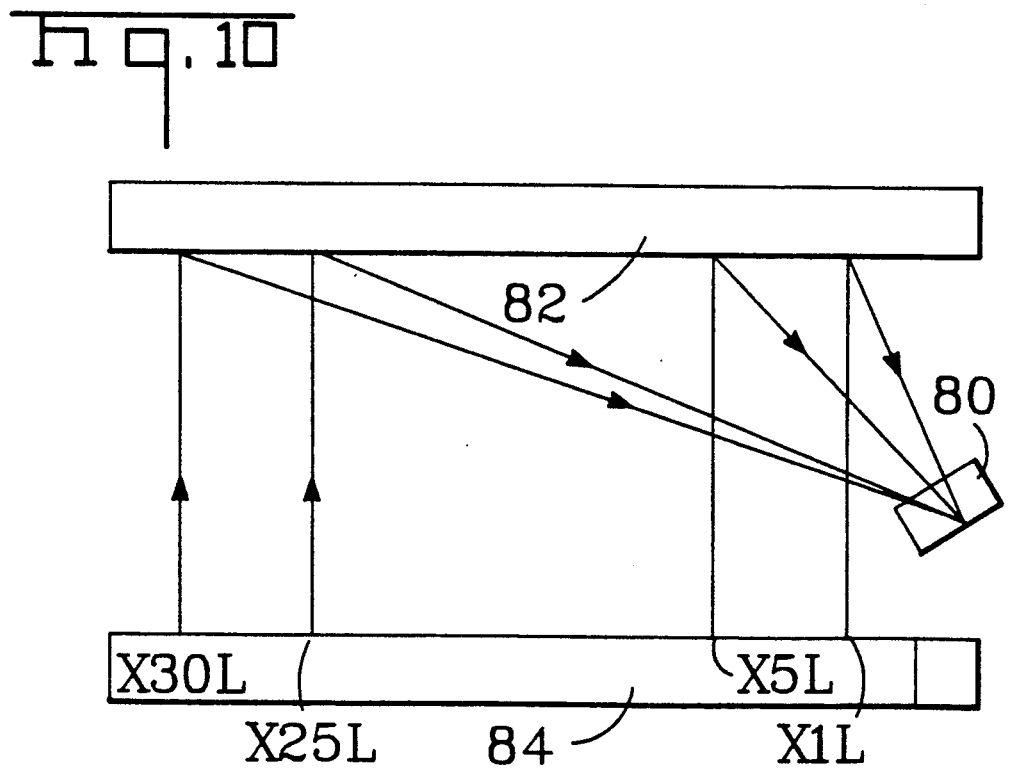

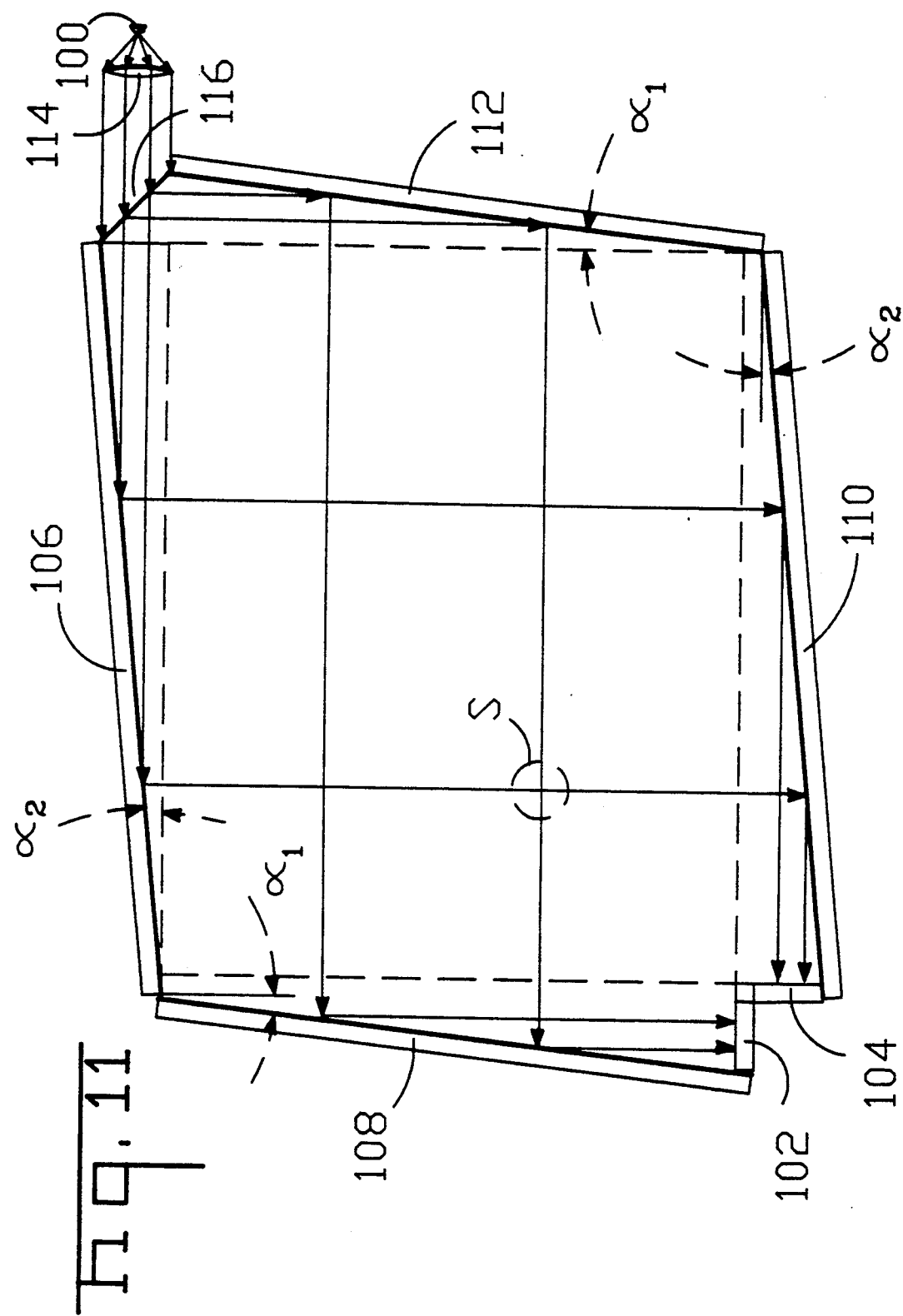

LIGHT BEAM DETECTION UTILIZING HOLOGRAM

This application is a continuation of application Ser. No. 07/286,558 filed Dec. 19, 1988, now abandoned.

FIELD OF THE INVENTION

The present invention relates to the concept, apparatus, and method of providing a coherent light source lensed to cover an area in conjunction with reflection of light by holographic reflecting surfaces and detector means arranged to detect the presence of a stylus inserted in such area and, in certain embodiments, locate the coordinates of such stylus. The invention in one embodiment utilizes a reflecting hologram made to project parallel light over an area from a single source of light, and in alternative embodiments, employ multiple sources of light to form parallel beams over such area reflected by a hologram to a single point detector in conjunction with appropriate circuitry. The invention concept has applications for security, safety, and touch entry.

BACKGROUND OF THE INVENTION

Opto-matrix frames have been developed which utilize rows of light sources called phototransmitters and rows of light detectors called photoreceptors arranged in X and Y arrays to effectively cover a given area. The light beams propagated over such area may be selectively broken by the insertion of a stylus such as a finger to provide an electronic signal. This signal is in fact the absence of light, in reality, a shadow created by the stylus detected by appropriate receptors. Such frames have found widespread use in touch input or touch screen entry devices wherein the frames are fitted over the information display units of computers and the like. U.S. Pat. No. 4,267,443 titled "Photoelectric Input Apparatus" issued May 12, 1981 to Carroll et al. relates to the use of an opto-frame.

Large opto-frames have also been conceived for providing security or safety in order to alarm and/or arrest the movement of machinery or to prevent entry in unauthorized areas by either personnel or, for example, the hand of an operator of a punch press relative to the closure of dies in the press.

As a general rule, the cost and complexity of opto-frames has heretofore been proportionate to the number of transmitters and receptors. This number is proportionate to either the size of the area to be covered or to the resolution of the size of the stylus employed. As a general rule, the closer together physically the light elements, both receptors and transmitters, the higher the resolution or the ability to distinguish coordinate locations of a stylus or finger penetrating the light beam array. Also as a generalization, the largest part of the cost of opto-frames is for the receptors and transmitters and associated circuitry.

With this understanding as background, it is an object of the present invention to reduce the cost of opto-frames by reducing the number of light elements and associated drive circuits from that heretofore utilized. It is a further object of the invention to reduce the complexity and cost of the opto-frames and other area scanning optical systems for detection and coordinate location purposes by substituting reflecting means for numbers of transmitters or, alternatively, substituting reflecting means for detectors.

It is still a further object of the invention to employ holographic techniques to generate reflecting surfaces capable of directing light received from a single source over a broad area; or, alternatively, reflecting light from multiple sources to a single light receptor location in order to reduce the number of light elements employed in opto-frames. It is a final object of the invention to provide a novel technique of reflecting light for a variety of useful purposes.

SUMMARY OF THE INVENTION

The present invention in one embodiment simulates parabolic reflection of expanding light and in another embodiment utilizes a source of coherent light, such as a laser, suitably focused by lensing to provide in effect a sheet of light covering a given area. The source of light is typically located at the focal point of a simulated parabolic mirror which reflects light beams along parallel lines across such area to be detected by an array of receptors. Holographic simulation of a reflective surface is accomplished through holographic techniques wherein a hologram is generated through conventional reference and object beam to form fringing patterns cast upon a photographic emulsion to form, upon developing of such emulsion, a desired pattern of reflections. The technique allows, in this embodiment, the use of a single source of light for each X and each Y portion of an opto-frame, rather than multiple light elements as is used in the prior art.

In an alternative embodiment, multiple sources of light are arrayed along an opto-frame and a single receptor is used for each X and Y side of the frame coupled with a sequencing of the light sources to provide discrete timed pulses, the presence and/or absence of which establishes a coordinate location for a stylus inserted into the area of the opto-frame.

In yet a further embodiment of the invention, a charge-coupled device is utilized to detect the presence or absence of light reflected from holograms from, in one case, a single source of coherent light, and in another case, from multiple sources arrayed along the side of the opto-frame.

BRIEF DESCRIPTION OF THE DRAWINGS

FIG. 2 is a schematic and elevational view of an opto-frame utilizing a parabolic reflecting surface.

FIG. 5 is a schematic view depicting the technique of holographic recording to simulate parabolic reflection effects.

FIG. 7 is a schematic view of an alternative embodiment utilizing a holographic reflector simulating a half-parabola reflecting surface.

FIG. 8 is a schematic view showing an alternative embodiment employing multiple sources of light and a single receptor in conjunction with a holographic reflector focusing the reflected beams to a central point.

FIG. 9 is an alternative embodiment utilizing a single source of light and two holographic reflecting surfaces spaced apart to direct reflections upon a charge couple device capable of determining the spatial position of a beam.

FIG. 10 is a schematic view showing multiple sources of light reflected to a single area to be detected by a charge coupled device.

FIG. 11 shows an alternate embodiment utilizing a single light source with holograms disposed on the four sides of an illuminated area to project light toward X and Y charge coupled devices.

DETAILED DESCRIPTION OF THE INVENTION

Figure 1:
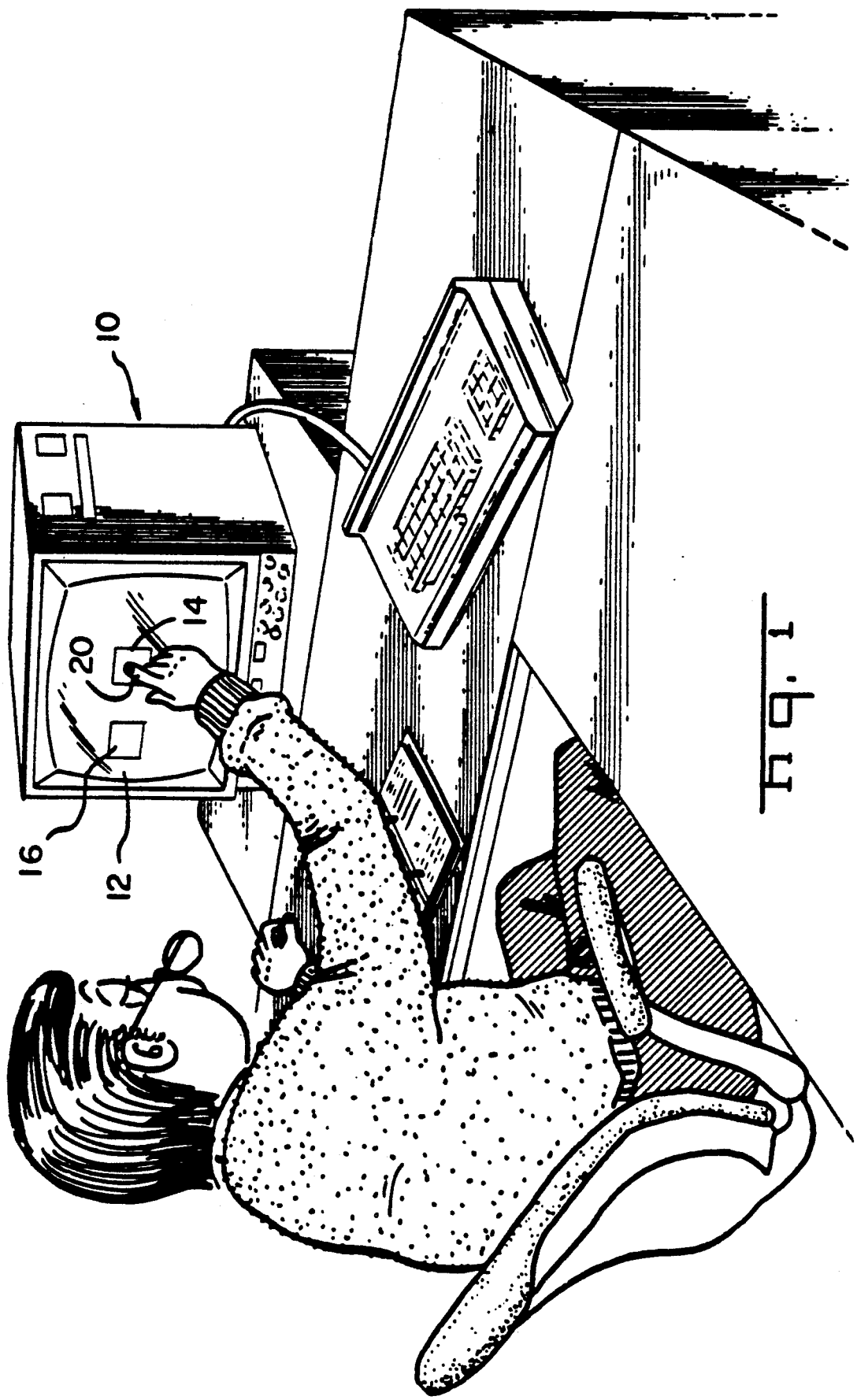
FIG. 1 is a perspective of a touch entry screen in conjunction with a CRT having an opto-frame.

Referring first to FIG. 1, the element 10 represents a display terminal typical of computers or data entry devices. The terminal 10 includes a display screen 12 which may be a CRT or alternatively, a flat screen display of the electroluminescent, plasma, LED, or other varieties now widely used. In FIG. 1, images such as 14 and 16 are shown on the screen as provided by the display. Prior art devices employ rows of light-emitting phototransmitters and photoreceptors could be disposed along the sides of the display in a conventional manner. A stylus shown as 20 in the form of a finger of an operator inserted proximate to the image 14 will interrupt one or more of the light beams emanating from the upper part of the opto-screen and being sensed by the receptors to be thereby detected and, in essence, locate an X-position of the stylus relative to coordinates on the screen. A Y coordinate will be similarly and effectively simultaneously located by light beams broken which emanate from the sources along the axis and otherwise detected by receptors opposite 20. The power of touch entry comes from utilizing the identification of a coordinate on the screen to effect some switch function, as for example, the menuing of information by display on screen 12 with the image 14 in turn identified with the coordinates detected by the insertion of stylus 20 within the light beams covering screen 12. The images shown in FIG. 1 as 14 and 16, and other images which may be made to appear thereon, are differentiated in position on the screen by virtue of using both the X and Y coordinates which differ as between 14 and 16 in the X sense.

In addition to uses for touch entry, the concept of providing an opto-frame for security and/or safety purposes has also been developed. With respect to such applications, an opto-frame placed around an entryway or in front of a dangerous machine can function to set off alarms or disable machine movement precluding unwanted entry or injury. The advantage to such usage over traditional "electric eye" techniques is that area, rather than merely a line or several lines, can be covered.

As a further point with respect to the opto-frame shown in FIG. 1 for a small display screen such as a 13- or 14-inch diagonal CRT screen, the number of transmitters would typically be 32, 16 per side, with a like number of receptors on the opposing sides of the frame. In certain applications where high resolution in identifying a given coordinate position of a stylus inserted into the area covered by the frame is desired, the number of transmitters and receptors may very well be increased half again, and for very fine resolution, doubled in number. For larger screens such as those utilized with respect to aircraft path monitoring and control, the numbers of receptors and transmitters employed may extend into the hundreds. With respect to the numbers of devices employed, there is a concomitant requirement for circuitry to switch the devices on and off in a prescribed sequence of scanning and to treat the intelligence resulting therefrom in an appropriately logical fashion to effect switch functions.

At this juncture, reference is hereby made to cofiled application U.S. Ser. No. 07/286,560 now U.S. Pat. No. 4,986,662 for a disclosure and description of the use of parabolic reflectors in conjunction with touch entry and other devices in order to reduce the number of light elements employed. FIG. 2 represents a schematic version of the disclosure of the cofiled and just mentioned application. In FIG. 2, a parabolic reflector 30 is shown extending along one of the X sides of an opto-frame with the opposite side 32 positioned at proximate the focal length of the parabolic reflector 30, such focal distance being shown as F in FIG. 2. A similar parabolic reflector 34 is shown along one side of the Y portion of the frame with a further frame side 36 shown opposite thereto. It, too, is positioned at the focal length of the particular reflector 34. It is to be understood that if the area to be covered shown as A in FIG. 2 is rectangular as is indicated, the shape of the parabolic reflectors 30 and 34 would be different from each other and have different focal lengths. If the area were square, the X and Y reflectors would have focal lengths and parabolic mirrors essentially identical to each other. In accordance with the invention concept detailed in the abovementioned cofiled application and incorporated herein by reference, there is in FIG. 2 but a single source of light for each X and Y side of the frames, namely, side 32 for the X side, and side 36 for the Y side. These sources of light are suitably lensed to spread light generated therefrom over the parabolic reflector surface in the opposite side of the frame. This is schematically shown in FIG. 2 for both X and Y sides. Sources of light of an appropriate infrared wave length are preferred and one such device which operates on a wave length in the neighborhood of 880 nanometers is provided through the Siemens Company, their unit SFH409, a gallium aluminum arsenide device. When the source of light such as that shown at position F.O.X. denominating the zero point for the X light source side is pulsed or energized, beams of light, are cast onto the reflector surface of 30 simultaneously. These beams of light are reflected to various locations on the side 32 of the opto-frame, such locations being shown as 10L and 30L representing the tenth and thirtieth positions along the left side as measured from the focal point of the frame. Other beams are reflected upon the position shown as 20R and 25R on the right side of the frame relative to the zero point in the center of the frame. At each of the points such as 10L, 30L, 20R, and 25R, along with all the other points from 1 through 30 or more, if desired, an appropriate receptor, is located to receive light cast upon it by the reflection from the reflective surface of 30. Each of the individual receptors is connected to be energized by circuit and drives (not shown) in a sequence beginning with the ones closest to the zero point of the frame. In the illustrative embodiment of FIG. 2, the location 10L would receive an energizing pulse before the next location and well before the position 30L would receive energization, last in the sequence, so that the simultaneous broadcast of light and reflection is sequentially scanned out from the position F.O.X. to the left and to the right.

With respect to the Y side of the frame 36 and the reflector surface 34, the same technique is utilized with the light broadcast from F.O.Y. being received sequentially by receptors positioned in arrays at locations 1 through 30 left and right along the frame, there being a single one shown at location Y20R and at location Y20L.

The sequential scanning of the receptors operates in the following manner. When a stylus S, as shown in FIG. 2, is inserted, the energization of 10L before the energization of 30L means that the reflected beam will be detected at the position 10L through the detection of the shadow cast by S blocking the broadcast beam. A circuit of the type known to those skilled in the art and therefore not shown is utilized to disable further counting or sequencing of the receptors once a "hit" has been detected. That means that once a shadow has been detected at position 10L, no further receptors will be caused to scan along the left side of the axis. The blocking by S of the beam which would be detected at position 30L is thus avoided and the so-called false hit is accordingly avoided.

The same sort of operation occurs to the right side of the frame with respect to 20R and 25R locations. The Y side of the frame, including reflector 34 and side 36, work in a similar fashion with the source at F.O.Y. being sequentially scanned by receptors to the left and right thereof, such as the receptor shown at position Y20R in FIG. 2.

In brief summary, the X and Y light sources are pulsed with receptors arrayed along X and Y sides of the frame sequentially pulsed progressively outwardly from the sources of light to receive and detect light reflected from parabolic reflectors opposite to the sides containing the sources. A stylus inserted into the area is detected in X and Y coordinates, and the system employs a fraction of the light elements heretofore required by prior art devices.

Figures 3A, 3B:
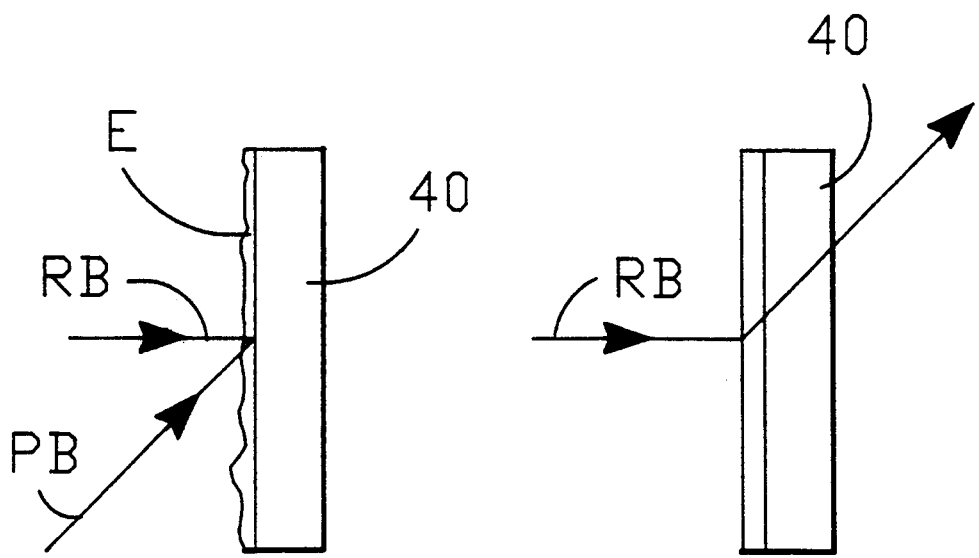
FIGS. 3A and B are schematic views depicting holographic recording in a transmission mode.

Reference is hereby made to the book, *The Complete Book of Holograms, How They Work and How to Make Them* by Kasper and Feller, J. Wiley and Sons, Inc., (1987), for background in the use of holographic techniques. Referring now to FIGS. 3A and B, the plates shown as 40 may be assumed for the moment to constitute glass plates of the type utilized in holography, typically glass plates on the order of $\frac{1}{8}$" thick having good light transmission qualities and coated with a photographic emulsion shown as E in the FIG.. The emulsion E is, in this case, made sensitive to infrared light. In accordance with standard holographic techniques, a reference beam shown as RB in FIG. 3A is directed against 40 in conjunction with an object beam here referred to as a picture beam, or PB, at an angle to the axis of orientation of RB which is orthogonal to the plane of plate 40. The resulting light fringing effect in essence causes a chemical change in the emulsion which leaves when the emulsion is "fixed" or developed, a reflecting surface so disposed and oriented that light thereafter cast upon the plate 40 in the form of the original beam RB will be directed and transmitted precisely through the plate along the axis of the original picture beam PB. In accordance with holographic techniques, images would be projected in space behind or to the right of the holographic plate 40 as shown in FIG. 3B.

Figures 4A, 4B:
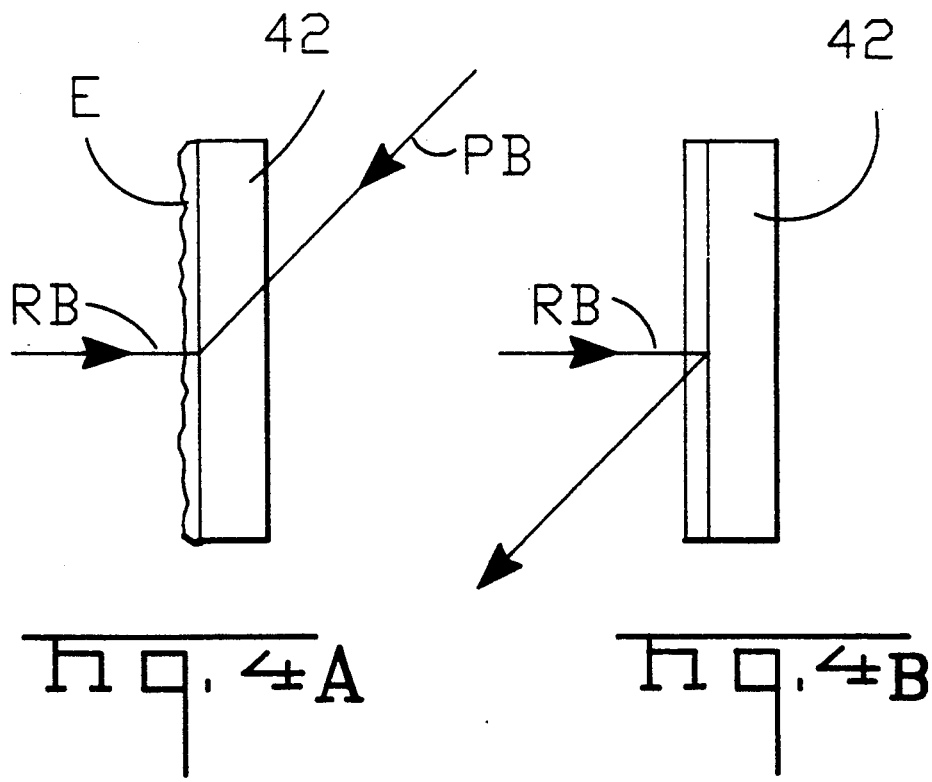
FIG. 4A and B are schematic views depicting holographic recording in a reflective mode.

Referring now to FIG. 4A and B, holographic recording in the reflective mode is shown with respect to holographic plate 42 containing an emulsion E which is energized or chemically activated by the combined energies of reference beam RB directed from the left-hand side of the plate and the picture beam PB directed through the plate from the reverse side with respect to beam RB. The combined energies of the two beams effectively cause a chemical reaction in the emulsion E which, when developed as in the previous example, becomes a hologram brought into being at a time later by casting RB upon the surface of 42 in the manner shown in FIG. 4 to generate an image on the same side as the source RB and along an axis of the picture beam as previously mentioned.

Referring now to FIG. 5, a holographic plate 44 containing an appropriate emulsion E is depicted so that a parabolic holograph image in a reflective mode can be prepared. A source of light shown as 46 is provided for the reference beam RB suitably lensed (lenses not shown) to extend over the area along one side of the plate 44, the side containing an emulsion E. A second source of light for the picture beam PB is shown in FIG. 5 lensed to broadcast light toward plate 44 through a parabolic lens shown as 50 which results in the beams of light forming the picture beams being in essence parallel to each other but at an angle to the orientation of RB. The emulsion is thus exposed to a fringing light pattern in the manner previously described. The chemical reaction in the emulsion is dependent on the local intensity of the light and when developed and appropriately fixed, provide a reflective hologram pattern simulating a parabolic mirror.

Figure 6:
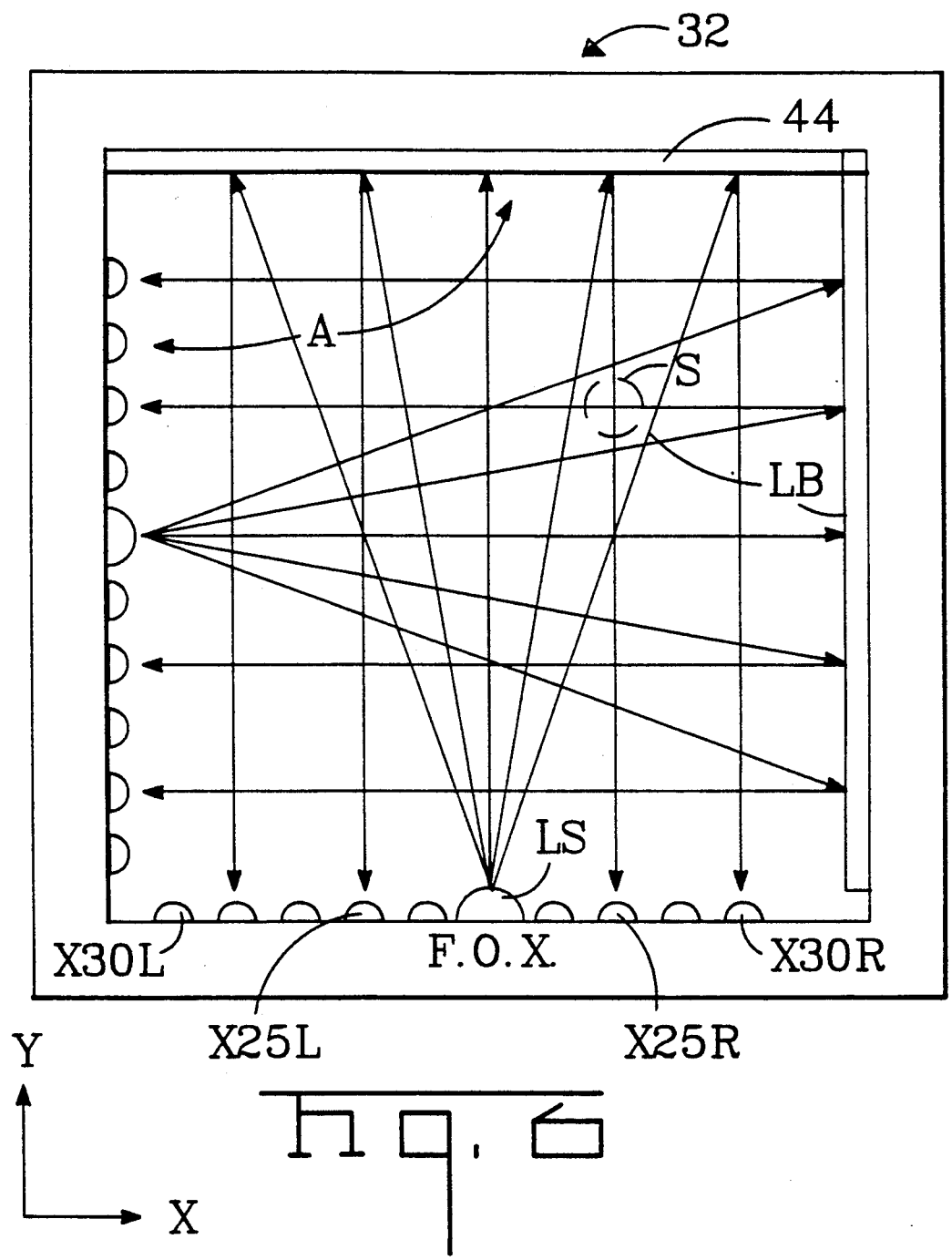
FIG. 6 is a schematic view of a holographic reflector employed relative to the X axis and frame of an opto-frame.

FIG. 6 shows a holographic reflector, such as 44, employed relative to the X side of opto-frame 32. There, at the focal length F.O.X. related to the lens 50 shown in FIG. 5, is a source of coherent light LS appropriately lensed to cast beams in a diverging or first beam pattern upon the surface of 44 resulting in reflections of light beams LB in a parallel or second beam pattern which strike the receptors along an opposite surface. In FIG. 6, illustrative positions are shown to the left side as X25L and X30L and as X25R and X30R on the right side. In accordance with the invention concept, beginning with X1L, not shown, the receptors would be sequentially energized outwardly away from F.O.X. Thus, the receptor at X25L would be energized to detect or not detect light before the receptor associated with position X30L would be energized, all in accordance with the invention concept to avoid false hits as previously described. Simultaneously, receptors for X1R through X25R and X30R positions would be scanned to produce a scan cycle for the opto-frame. In FIG. 6, the presence of a stylus S would generate a shadow indicating a "hit" and further scansion would be halted by a circuit controller not shown.

A holographic reflector, and a second source of light LS2 and array of receptors, would be employed to obtain a Y scan and form an X-Y opto-frame.

As can be appreciated from FIG. 6, the single frame structure for X and the associated light source and array of receptors has utility for detecting penetration of the area A since any stylus penetrating that area will generate a signal. The structure represented in FIG. 6 thus could be utilized for security and/or safety purposes, providing only an indication of penetration of the area and one location, an X location.

FIGS. 7 and 8 show alternate embodiments scanning along a single axis. Of course, both X and Y reflectors and light beams could be generated with these alternate embodiments. Referring now to FIG. 7, an alternative version including an opto-frame side 50 containing a series of receptors, LR, one for each of the locations X1L through X30L and to the side of such positions, a source of light denominated LS at position F.O.X., suitably lensed to broadcast light in a diverging first beam pattern covering the interior surface of a holographic reflector shown as 52. The beams of light LB strike the holographic reflective surface and are reflected in a parallel second beam pattern back toward the receptors positioned in 50. Once again, the receptors are scanned sequentially from a point X1L closest to the source of light at F.O.X. progressively toward the end and last position X30L in order to avoid false hits. In the application depicted in FIG. 7, the holographic reflector would be made in the manner previously described with the exception that the reference beam RB would be positioned to one side of the holographic plate with the picture beam caused to strike the plate with parallel lines as heretofore described. Worth mentioning here is the invention concept which relates to positioning the source of light in a variety of positions for the convenience of the particular application utilized. The source of light at F.O.X. can thus be in the center as shown relative to FIG. 6 or to one side, as shown relative to FIG. 7. It could indeed be in a variety of other positions to the left or right, or even to the side of the opto-frame.

In the next embodiment, the process herebefore described is reversed. Plural light transmitters and a single receptor are used. In FIG. 8, an opto-frame side 60 is included having a multiple light source, a series of transmitters LS, one for each of the positions X1L through X30L. The transmitters are sequentially pulsed on progressively outward from its receptor LR, a single receptor, in this case located at the position F.O.X. The transmitter elements located at the positions X1L through X30L are simple transmitter devices aimed, or oriented, to broadcast light in a first beam pattern toward a holographic reflector shown as 62, the beams therefrom being essentially parallel one to the other. It is to be understood that beams typically have a certain spread, a lobe, having a given orientation but in area and intensity dependent upon the characteristics of the transmitter device relative to drive current. Contrary to the previous examples, the holographic reflector 62 will cause relatively parallel beams emanating from 60 to be focused in a converging second beam pattern to the location F.O.X. wherein they will be received and detected. Pulses will accordingly be generated in a stream or series related to the pulse rate of the transmitters at positions X1L through X30L. The configuration of FIG. 8 would be utilized with an appropriate circuit which would accept the stream of pulses emanating from the receptor F.O.X. and associate the first lack of pulse, or presence of shadow caused by stylus being inserted into the field or area defined by a opto-frame, as indication of a stylus location in the X sense. As previously mentioned, a circuit needs to be provided which will disable further scansion once a hit has been detected. That time-related pulse will indicate a given position X1L though X30L. As with prior art circuits, a number of different cycles of scansion may be employed to verify a given location. As with previously discussed embodiments, the structure of FIG. 8 could also have a comparable Y opto-frame, the two together providing XY coordinates in a manner previously described.

Referring to FIG. 9, yet a further embodiment is shown, including an opto-frame having a single source of light or transmitter located at a position F.O.X. to one side of the frame area and oriented and lensed to broadcast light beams in a diverging first beam pattern against the interior surface of a holographic reflector 72 beams of light, shown here as LB once again, are reflected from 72 in a parallel second beam pattern extending across the field or area of the frame to strike an additional holographic reflector 74 and be reflected more or less parallel to the reflector 72 in a parallel third beam pattern and onto a charged coupled device labeled 76 in FIG. 9. The device 76 includes a series of sensitive receptors comparable to the X1L and X30L positions heretofore described except on a more compact basis. A typical CCD device such as the TC 103 has 2048 numbers of positions in an array which is 2048 by 1. Light reflected from the hologram striking individual receptors of the CCD device will accordingly be detected and effect a pulse output associated with a given position. The device 76 or outputs therefrom are energized sequentially so that a position X1L at the lower end thereof is sensitized first followed by a sequential energization of positions X2L through X30L. This sequencing will, as before, preclude false hits by shadows causing the blocking of outgoing light from position F.O.X.

As with previous examples, it is also contemplated that a Y opto-frame, including light source and CCD may be employed. Worth mentioning is the fact that the CCD could be employed to handle both the X and the Y reflections. Accordingly, the invention contemplates an orientation of the CCD device obliquely to the plane of the holographic reflector 72 within the field of view of the CCD device.

FIG. 10 shows an embodiment of an X portion of an opto-frame wherein the CCD device 80 is obliquely oriented relative to a holographic reflector shown as 82 to receive therefrom light in a second converging beam pattern, where holographic reflector 82 is made to reflect light received in a parallel first beam pattern from multiple sources at positions X1L through X30L of optoframe side 84, which sources are sequentially pulsed from right to left in the structure of FIG. 10 in the manner and for the purpose heretofore described.

FIG. 11 is another alternate embodiment in which holograms are used both to project light across an illuminated area and to reorient light, outside the illuminated area, toward a light receptor. The embodiment of FIG. 11 uses a single light source 100, which can be a laser, and two light receptors 102 and 104 in the form of charge coupled devices. An illuminated field substantially as represented by the dashed lines can be covered by these three active devices. Four holograms 106, 108, 110, and 112, one along each side of the illuminated area are employed. A light collimating lens 114 orients light emanating from light source 100 directs parallel beams onto a light splitter 116. Collimated light from the single source 100. is then projected onto reflective holograms 106 and 112, which are oriented at slight angles $\alpha_2$ and $\alpha_1$ respectively to the beams of incident light. Note that holograms 106 and 112 do not simulate a parabolic reflecting surface. Instead holograms 106 and 112 merely form reflective surfaces which project light across the illuminated area within the dashed lines in parallel beams in orthogonal arrays. Holographic surfaces 108 and 110 then reflect the holograms from reflective surfaces 106 and 112 at slight angles $\alpha_1$ and $\alpha_2$ respectively toward charge coupled devices 102 and 104. Light, in the form of holograms, striking charge coupled devices 102 and 104 will be detected at unique spatial locations within the charge coupled device representative of the X and Y coordinates within the illuminated area. Thus an opaque object or stylus S intruding within the illuminated area will be detected and its coordinates will be determined by the unique points on charged coupled devices 102 and 104 where a hit is determined. As with other input devices of this type, a hit corresponds to the absence of a signal from the light detecting device.

The invention contemplates the use of holograms, from both transmission mode and the reflective mode, in conjunction with light sources and detectors physically arranged in a variety of ways to cover areas so as to detect X and Y coordinates or penetration of an area for touch entry, safety and security purposes. The appropriate geometry relative to the area desired to be covered, and the appropriate selection of either multiple transmitters and a single CCD-type receiver, or multiple receivers, and a single light source with suitable lensing and with suitable holographic reflecting surfaces, is anticipated and contemplated, the limitations being those intrinsic to the skills with which the holograms are made and the physical limitations of lenses, sources, receptors, transmitters, and the like.

Having disclosed the invention in terms intended to enable its practice in several preferred modes, I now set forth what is inventive in the appended claims:

I claim:

1. In a system for detecting the penetration of a given area by an object and location thereof, first means operable to generate a sheet of light including a source of coherent light and lensing to spread said light over at least a substantial part of said area, at least one array of detectors arranged along at least one side of said area adjacent said source of light and a holographic reflecting means comprised of thin film reflecting holograms positioned along a side opposite to said source of light to reflect light from said source, said holographic reflecting means adapted to reflect said light along parallel lines extending over said area and a scansion means for selectively energizing said detectors in a sequence extending from a said detector closest to the said source of light to a said detector farthest from said source of light whereby to scan said area sequentially and preclude false detection of an object within said area.

2. Touch input apparatus having a touch screen for detecting the presence of an object within a given area defined by a plurality of sides, the apparatus including source means of coherent light adapted and positioned to broadcast light to strike at least one side, holographic means comprised of a flat planar film extending along the periphery of said area along each said at least one side, said film being developed to receive said light in a first beam pattern and reorient said light into at least a second beam pattern, detector means positioned along a further side to detect said light reoriented by said holographic means and responsive to said detection of light to generate a signal indicative of the absence of an object blocking a said beam within said area and further including means to detect the blocking of a said beam as an indication of the presence of an object within said area, said source means comprising a first light positioned along a first said side and associated with X coordinates of said touch screen and a second light source positioned along a second said side and associated with Y coordinates, both arranged to emit light directly across said given area, said holographic means includes a pair of reflective film elements positioned on opposing third and fourth said sides to provide reflections representative of X and Y coordinates and said detector means includes elements positioned along said first and second sides to detect reflections traversing said given area from said holographic elements representative of said X and Y coordinates, and the apparatus further includes means to preclude the detection of false shadows caused by interruption of outgoing light from said light source means.

3. Touch input apparatus having a touch screen for detecting the presence of an object within a given area defined by a plurality of sides, the apparatus including source means of coherent light adapted and positioned to broadcast light to strike at least one side, holographic means comprised of a flat planar film extending along the periphery of said area along each said at least one side, said film being developed to receive said light in a first beam pattern and reorient said light into at least a second beam pattern, detector means positioned adjacent said given area to detect said light reoriented by said holographic means and responsive to said detection of light to generate a signal indicative of the absence of an object blocking a said beam within said area and further including means to detect the blocking of a said beam as an indication of the presence of an object within said area, said light source means being constituted by a plurality of light sources oriented along a first said side to produce parallel beams essentially directly transversing said given area and covering said holographic means opposed therefrom, with said holographic means focusing said beams across said given region to a single point adjacent said given area and spaced from said holographic means to be detected by said detector means, and the apparatus further includes means to sequentially operate said light sources to produce a series of light beams detected by said detector means.

4. The touch input apparatus of claim 3 wherein said holographic means is a said film having a holographic recording thereon having characteristics to operate in the reflective mode.

5. The touch input apparatus of claim 4 wherein said detector means is a charge coupled device.

6. The touch input apparatus of claim 5 wherein said detector means is disposed along said first side.

7. Touch input apparatus having a touch screen for detecting the presence of an object within a given area defined by a plurality of sides, the apparatus including source means of coherent light adapted and positioned to broadcast light to strike at least one side, holographic means comprised of a flat planar film extending along the periphery of said area along each said at least one side, said film being developed to receive said light in a first beam pattern and reorient said light into at least a second beam pattern, detector means positioned along a further side to detect said light reoriented by said holographic means and responsive to said detection of light to generate a signal indicative of the absence of an object blocking a said beam within said area and further including means to detect the blocking of a said beam as an indication of the presence of an object within said area;

said detector means being constituted by a plurality of discrete receptor devices along a said side opposed from a said holographic means;

said holographic means being a said film having a holographic recording thereon having characteristics to operate in the reflective mode, and said light source means and said discrete receptor devices being arrayed along a common said side and operable to emit light directly across said given area and receive light directly transversing said given area respectively; and the apparatus further including circuit means to selectively energize said discrete receptor devices in a sequential manner in a given direction to preclude the detection of false shadows.

8. The touch input apparatus of claim 7 wherein said light source means in a single source lensed to emit light to strike said holographic means in a first beam pattern and be reflected therefrom developing simultaneous reflection of light in said second beam pattern from said holographic means.

9. Touch input apparatus having a touch screen for detecting the presence of an object within a given area defined by a plurality of sides, the apparatus including source means of coherent light adapted and positioned to broadcast light to strike at least one side, holographic means comprised of a flat planar film extending along the periphery of said area along each said at least one side, said film being developed to receive said light in a first beam pattern and reorient said light into at least a second beam pattern, detector means positioned adjacent said given area to detect said light reoriented by said holographic means and responsive to said detection of light to generate a signal indicative of the absence of an object blocking a said beam within said area and further including means to detect the blocking of a said beam as an indication of the presence of an object within said area;

said light source means being a single source lensed to emit light to strike a first said holographic means in a first beam pattern;

said first holographic means being adapted to reorient said light into a said second beam pattern of parallel beams;

said apparatus including a second holographic means opposed from said first holographic means and being a film developed to receive said light in said second beam pattern and reorient said light into a third beam pattern;

said first and second holographic means are films having a holographic recording thereon having characteristics to operate in the reflective mode, and said light source and said detector means are disposed along a common side different from sides containing said first and second holographic means; and said detector means being a charge coupled device disposed to detect said light reoriented by said second holographic means.

10. Touch input apparatus having a touch screen for detecting the presence of an object within a given area defined by a plurality of sides, the apparatus including source means of coherent light adapted and positioned to broadcast light to strike at least one side, holographic means comprised of a flat planar film extending along the periphery of said area along each said at least one side, said film being developed to receive said light in a first beam pattern and reorient said light into at least a second beam pattern, detector means positioned adjacent said given area to detect said light reoriented by said holographic means and responsive to said detection of light to generate a signal indicative of the absence of an object blocking a said beam within said area and further including means to detect the blocking of a said beam as an indication of the presence of an object within said area;

said holographic means including four distinct film elements associated in opposing pairs representative of X and Y coordinates and positioned and oriented to provide parallel beams of light transversing said area representative of said X and Y coordinates;

said coherent light source means comprising a single light source unit and including lensing to collimate said coherent light to strike a first said film element of said pair and be reflected thereby across said area to strike a second said film element of each said pair and be further reflected thereby to a respective detector means;

said apparatus further including a light splitter positioned between said lensing and said first film elements to cause said coherent light after collimating to be directed towards both said first film elements; and each said detector means comprising a single charge coupled device associated with said pair operable to sense beams of light distinctly each physically separate one from the other as related to a respective one of said X and Y coordinates.

* * * * *